United States Patent
Aaltonen et al.

(10) Patent No.: US 8,274,168 B2
(45) Date of Patent: Sep. 25, 2012

(54) GENERATING HYDROENERGY

(76) Inventors: Janne Aaltonen, Turku (FI); Markus Aarnio, Helsinki (FI)

( * ) Notice: Subject to any disclaimer, the term of this patent is extended or adjusted under 35 U.S.C. 154(b) by 47 days.

(21) Appl. No.: 13/008,107

(22) Filed: Jan. 18, 2011

(65) Prior Publication Data

US 2012/0056430 A1 Mar. 8, 2012

(30) Foreign Application Priority Data

Jan. 19, 2010 (EP) .................................... 10151095

(51) Int. Cl.
*F03B 13/00* (2006.01)

(52) U.S. Cl. .......................................... 290/43; 290/54

(58) Field of Classification Search .................... 290/43, 290/54; 60/398; 415/3.1
See application file for complete search history.

(56) References Cited

U.S. PATENT DOCUMENTS

| 3,214,915 | A | | 11/1965 | Weibel | |
|---|---|---|---|---|---|
| 4,211,077 | A | | 7/1980 | Cassidy | |
| 4,443,707 | A | | 4/1984 | Scieri et al. | |
| 5,222,833 | A | * | 6/1993 | Gorlov | 405/76 |
| 8,093,743 | B2 | * | 1/2012 | Bozano | 290/53 |
| 2007/0257493 | A1 | * | 11/2007 | Alstot et al. | 290/54 |
| 2007/0284883 | A1 | * | 12/2007 | Cafariello | 290/54 |
| 2011/0042956 | A1 | * | 2/2011 | Frye | 290/54 |
| 2011/0109089 | A1 | * | 5/2011 | Frye | 290/54 |

FOREIGN PATENT DOCUMENTS

| FR | 2 438 161 A1 | 4/1980 |
|---|---|---|
| GB | 2 032 008 A | 4/1980 |
| WO | 2007/009192 A1 | 1/2007 |

* cited by examiner

*Primary Examiner* — Tho D Ta
(74) *Attorney, Agent, or Firm* — Ziegler IP Law Group, LLC (57) ABSTRACT

A method of recovering energy from the potential energy of water in a body of water includes providing a reservoir at least partly below a surface of a body of water, leading water from the body of water in the reservoir, and storing potential energy by removing water from the reservoir. A hydroenergy plant recovers energy from the water while leading the water into the reservoir using a turbine and an electric generator coupled to the turbine.

20 Claims, 7 Drawing Sheets

GENERATING HYDROENERGY

CROSS-REFERENCE TO RELATED APPLICATIONS

This application claims priority to and the benefit of European Application No. 10151095.6, filed Jan. 19, 2010, the disclosure of which is incorporated by reference herein in its entirety.

BACKGROUND

1. Field

The aspects of the disclosed embodiments relate to a new way of recovering energy from the potential energy of water in a body of water. Particularly, the aspects of the disclosed embodiments relate to a method of generating hydroenergy, a hydroenergy generating plant, a use of the hydroenergy generating plant and a method of storing potential energy of water.

2. Brief Description of Related Developments

As a general rule, it is hard to store large amounts of electricity. Therefore energy is normally consumed at the same time it is produced. However, the demand for electricity varies over time. Typically there is lower demand for electricity during night time than day time. Common sources of alternative energy such as, for example, solar energy and wind energy, produce energy depending on the weather conditions and can be unpredictable and difficult to control. On the other hand, some production facilities such as nuclear power stations produce a mainly constant amount of energy practically all the time. Developing efficient ways of levelling peaks in electricity demand and storing electricity are therefore integral parts of development of energy systems of today.

Often, consumers are enticed to use more electricity at the low demand hours and less during peak hours in order to level the demand for electricity. For example many electricity companies are offering lower electricity prices for households during the night time than during the day time. There are hourly based electricity markets, e.g. the SPOT market in Nordic countries, with different electricity prices per hour depending on the supply and demand of the electricity. However, systems exist that attempt to vary electricity output or to store electricity in order to meet the varying demand.

In a hydroelectric power plant, water is led through turbines connected to electric generators to produce electricity. A common system of storing electricity is a hydro-pumped storage facility in which a hydroelectric power plant is connected to a water storage installation at a higher elevation. Electricity is stored as potential energy by pumping water to a higher elevation reservoir, such as a lake or a dam in a river, during low consumption of electricity. Thus, pumps are run with low-cost off-peak electric power. The water from the higher elevation reservoir is then used in the hydroelectric power plant at a lower elevation during high demand of electricity. The system increases revenue by selling more electricity during periods of peak demand, when electricity prices are highest. This process, also called pumped storage hydroelectricity, is the most common form of grid energy storage used today.

There are numerous examples of pumped storage hydroelectricity systems. One example of such a system is described in U.S. Pat. No. 4,443,707.

The most advantageous and mostly used places for hydropumped storage facilities have traditionally been mountainous regions and already dammed rivers. Naturally, a vast demand for energy storage is present in other locations, as well. Although production of hydroelectricity can be considered as virtually non-polluting and renewable, building of new facilities is often considered as a great stress to nature. Also fluctuations in the water level in reservoirs normally have negative effects to the ecosystem.

Additionally, prior art such as WO2007/0009192 of Hastings et al. discloses a power generation system using array of water-containing vessels immersed in a large body of water to a substantial depth with the lower end of the vessel spaced above the water bed. A problem with such a system is control of buoyancy. As the vessel is emptied, there is significant force applied by the pressure of water to raise the vessel above the surface of the water.

It would be advantageous to efficiently handle both high and low demand and supply periods of electricity.

It would be advantageous to obtain a reliable, cost efficient and easy way of storing energy.

It would be advantageous to provide cost effective energy storing possibilities to new regions.

It would be advantageous to obtain an energy storage technology that improves the manageability, controllability, predictability and flexibility of supply and demand of electricity.

SUMMARY

As described herein, the disclosed embodiments overcome one or more of the above or other disadvantages known in the art.

The embodiments and advantages mentioned in this text are in suitable parts applicable to the hydroenergy generating plant as well as the methods and uses according to the aspects of the disclosed embodiments, even if this is not always specifically mentioned.

The aspects of the disclosed embodiments are based on a surprising idea of storing potential energy of water not by adding water to a reservoir at a high elevation, but by emptying a reservoir at a low elevation.

One aspect of the disclosed embodiments relates to a method of generating hydroenergy that includes providing a structure in a body of water, the structure comprising a reservoir having an inner volume for water, the structure configured so that a portion of the structure is situated at least partly below a surface of the body of water and a bottom of the structure is situated at or below a level of a sea bed to limit an amount of water underneath the structure; storing potential energy by removing water from the reservoir; leading water from the body of water into the reservoir; recovering energy from the water while leading the water into the reservoir.

Another aspect of the disclosed embodiments relates to a hydroenergy plant that includes a structure arranged in a body of water, the structure comprising a top portion, a bottom portion and walls between the top and bottom portions defining a reservoir therein, the reservoir having an inner volume for water, the structure configured so that a portion of the structure is situated at least partly below a surface of the body of water and the bottom of the structure is at or below a level of a sea bed to limit an amount of water underneath the structure; removal means for removing water from the reservoir; inlet means for leading water from the body of water into the reservoir; energy recovering means configured to recover energy from potential energy of the water led into the reservoir through the inlet means.

A further aspect of the disclosed embodiments relates to a method of storing potential energy of water that includes providing a reservoir for water, a portion of the reservoir being positioned at least partly below a surface of a body of water, the reservoir having a top portion and a bottom portion, and walls defining the reservoir, wherein the top portion has a diameter that is less than a diameter of the bottom portion; positioning a bottom portion of the reservoir on a bed of the body of water; leading water from the body of water into the reservoir; and storing potential energy by removing water from the reservoir.

In other words, the aspects of the disclosed embodiments can be described as an energy storage arrangement where a large "hole", i.e. a reservoir, is situated in a body of water such as an ocean, a sea, a lake, a river or any other suitable body of water. In an embodiment the hole would be made by building a substantially water tight structure that could be for example attached to bottom of the sea. The bottom of the body of water, e.g. the sea bottom, may function as the bottom of the storage reservoir. During low demand (e.g. low price for electricity) the structure would be pumped empty of water. During high demand (e.g. high price for electricity) the structure would be filled with water and at the same time energy would be recovered from the energy of the water flowing into the reservoir.

In one embodiment, the body of water contains so much more water than the reservoir that the water level of the body of water is not affected by the pumping.

In another embodiment of the disclosure, energy is recovered by rotating a turbine which is arranged to use an electric generator, thereby producing electricity. Energy recovering means may comprise a turbine, an electric generator and suitable control means as one generator unit.

In a further embodiment of the disclosure, a structure, such as a dam or the like is arranged in the body of water. The structure can be partly or totally man-made. It is possible to use natural structures such as a shore, the bottom of the sea or an island as a part of the structure. The structure comprises or forms a reservoir at a low elevation compared to the body of water. This reservoir is arranged partly or totally below the surface of the body of water. The reservoir can be e.g. an inside of a dam or the like. If walls of the reservoir reach above the surface level of the body of water, the reservoir can be open at its top. If the reservoir is totally under the surface level of the body of water, it should be at least substantially water tight, i.e. closed. The reservoir comprises an inner volume for water. The inner volume is substantially watertight from the body of water, if wanted. Inlet means provide a closable connection between the body of water and the inner volume for leading water into the reservoir. Inlet means can comprise e.g. pipes, openings, valves or other suitable conducting means. Removal means for removing water from the reservoir can comprise pumps, pipes, openings, valves or other suitable conducting means. Removal means can be called a pump unit.

In an embodiment of the disclosure, inlet and removal means can be at least partly same parts, e.g. the conduits or openings may be used for the water flow in both directions. Energy recovering means such as a turbine, an electric generator and suitable control means can be arranged to recover energy from the water flow led into the reservoir through the inlet means.

In an embodiment of the disclosure, the hydroenergy generating plant comprises bypass means to fill the reservoir without leading the water via the energy recovering means. It may sometimes be advantageous to fill the reservoir without rotating a turbine or producing electricity. Bypass means may e.g. comprise a simple conduit or pipe through the wall of the reservoir with a closable valve. Opening the valve would lead into filling of the reservoir up to the level of the body of water.

In an embodiment of the disclosure, the hydroenergy generating plant comprises a reversible turbine/generator assembly arranged as both the removal means and the energy recovering means. This means that water is led into the reservoir and water is removed from the reservoir via the same assembly capable of functioning both as a pump or a turbine. In one embodiment a pump unit, a generator unit and inlet means needed are all combined into a pump/generator unit. A reversible turbine/generator assembly can be a so-called double stage regulated pump-turbine, which gives the possibility to utilise very high head for pumped storage, hence providing higher energy and efficiency, but also variable speed drive allowing wider grid support such as frequency regulation in pumping mode as well as larger operation window, hence yielding better economics, flexibility and reliability. In one embodiment, there is a separate pump for emptying water from the storage unit. The energy can be generated via vertical or horizontal Kaplan type turbine allowing good efficiency with low head. In an alternate embodiment a Kaplan type turbine is used also for pumping.

In one embodiment of the disclosure, the hydroenergy generating plant comprises a compressed air energy storage. This means that air is compressed in the reservoir with the force exerted by the water led from the body of water into the reservoir. In one embodiment, energy is recovered by leading the compressed air out of the reservoir via air exhaust means such as one or more turbines arranged in the structure. Air exhaust means may comprise sensors and regulators arranged to lead compressed air out of the reservoir when air pressure in the reservoir exceeds a certain limit value. Air is led into the reservoir through air inlet means during the removal of water from the reservoir. Air and water in the reservoir may be in direct contact with each other, but they may also be separated from each other.

In an embodiment of the disclosure, the water from the reservoir is pumped into a cooling system of a power plant, such as a nuclear power plant. In one embodiment, the water removal means are connected to the cooling system of a power plant, and one or more pumps are arranged to pump the water out from the reservoir into the cooling system of the power plant.

In an embodiment of the disclosure, the body of water is in contact with outside of the walls on substantially whole perimeter of the reservoir. This means that the structure is not situated on the shore of the body of water but offshore.

The aspects of the disclosed embodiments provide an efficient and environmentally friendly technology for storing energy in new regions. There is no need for great natural differences in altitude such as rapids or mountain lakes.

BRIEF DESCRIPTION OF THE FIGURES

The aspects of the disclosed embodiments are described below in more detail with reference to the enclosed schematic drawings, in which.

DETAILED DESCRIPTION OF THE DISCLOSED EMBODIMENTS

For the sake of clarity, in the following description, the same reference numbers may be used for corresponding components of different embodiments.

Figure 1:
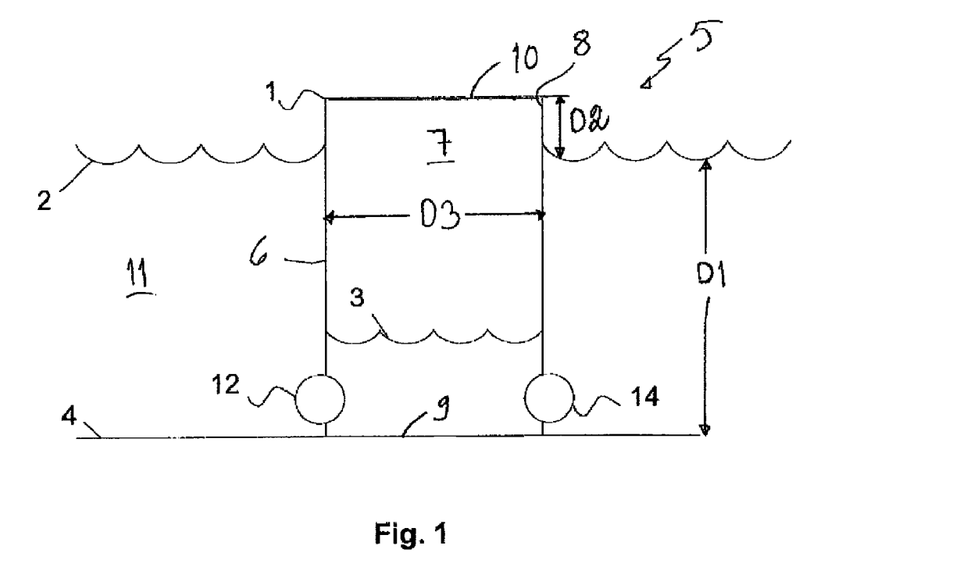
FIG. 1 illustrates a first embodiment of a hydroenergy generating plant.

A hydroenergy generating plant 5 according to one embodiment of the present disclosure is shown in FIG. 1. A water-tight construction or container 1 is arranged in a body of water 11, such as a sea or a lake or other body of water. Mainly vertical walls 6 define inside them a reservoir 7 with the form of a cylinder. The form of the reservoir is not limited to a cylinder, but its form may be arbitrarily chosen according to the needs. In alternate embodiments, the reservoir form may be similar to a honeycomb, square, hexagonal, elliptical etc. The walls 6 may be made e.g. of steel or concrete. The top 8 of the walls 6 reaches a distance D2 over the sea level 2. The distance D2 can be e.g. 0.5-20 m, 1-10 m or 2-5 m. The container 1 is attached or built in such a way that it stays firmly in the sea bottom 4. Distance D1 from the sea level 2 to bottom of the sea 4 may be in range of several tens of meters. The distance D1 can be e.g. 1-100 m, 10-60 m or 20-50 m. The diameter D3 of the circular container can be e.g. 5-300 m, 30-200 m or 40-150 m The container 1 has one or more pumps units and/or generator units 12 and 14 installed in the walls, near the bottom of the sea 4. Pumps are used to pump water out of the container 1. The water level 3 in the container therefore goes down as water is pumped. This phase is called as storing energy. As the energy is released from the system, the generators 12 and/or 14 let the water to go in the container 1 leading to rise of water level 3 in the container 1. As the water is taken in to the container via generator, units of electricity are formed.

The structure can be built directly adjacent to the bottom 4 of the body of water 11 with the bottom 4 functioning as a bottom wall 9 of the container. Alternatively the bottom wall 9 of the container can be, for example, of concrete or steel. There is no need to have a closed top or roof in the structure if the walls 6 reach high enough, but in some embodiments it might be preferable to have a top or a roof 10. The container may thus be open or closed at the top. If the container 1 is closed it may be made at least mainly air-tight. In one embodiment the horizontal cross-section of the container 1 is mainly round, i.e. a circle.

The amount and type of pumps or pump units as well as the amount and type of generators or generator units 12, 14 can be varied as needed. In an advantageous embodiment they are situated in the lower part of the construction and the container 1. In a further advantageous embodiment the hydroenergy generating plant 5 comprises one or more reversible turbine/generator assemblies 12, 14, which can both pump water out from the container and produce electricity when water is led in the container through them. In FIG. 1 there are two such reversible turbine/generator assemblies 12, 14. Assemblies 12, 14 include closing valves to control flow of the water in and out of the container. The embodiment of FIG. 1 can be run in any place with access to an electricity grid. One possible installation of the plant 5 could be close to a nuclear power plant or other electricity plant to be used as storage of excess electricity.

Figure 2:
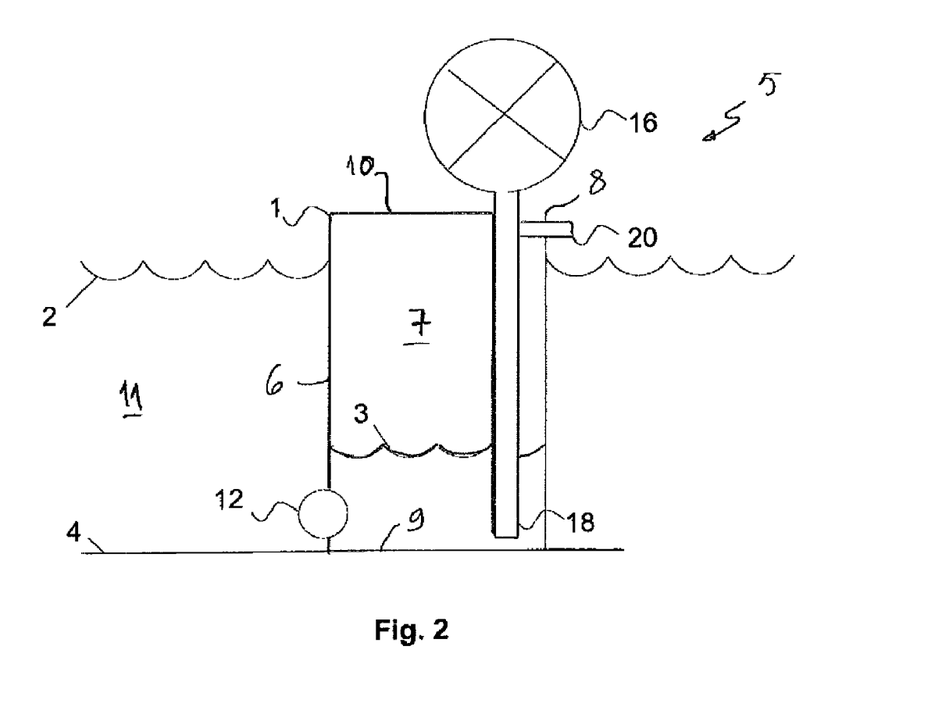
FIG. 2 illustrates a second embodiment of a hydroenergy generating plant.

The hydroenergy generating plant 5 can be arranged to function without any need of input electricity. The storing of energy, i.e. the emptying of the container 1 can be done using e.g. wind, wave or solar energy. FIG. 2 shows how conventional wind operated water pumps can be used to pump the container empty. A wind turbine 16 is arranged to pump water near the bottom 9 of the container with a pump 18. Water is pumped out via valve 20. When electricity is needed, water is led into the container via generator unit 12. Wind turbine 16 can alternatively be replaced by solar panels. When using solar panels the energy generated by panels could be used to run pumps to empty container. Also, for example motion created by waves in an ocean could be used to pump the container 1 empty.

Figure 3:
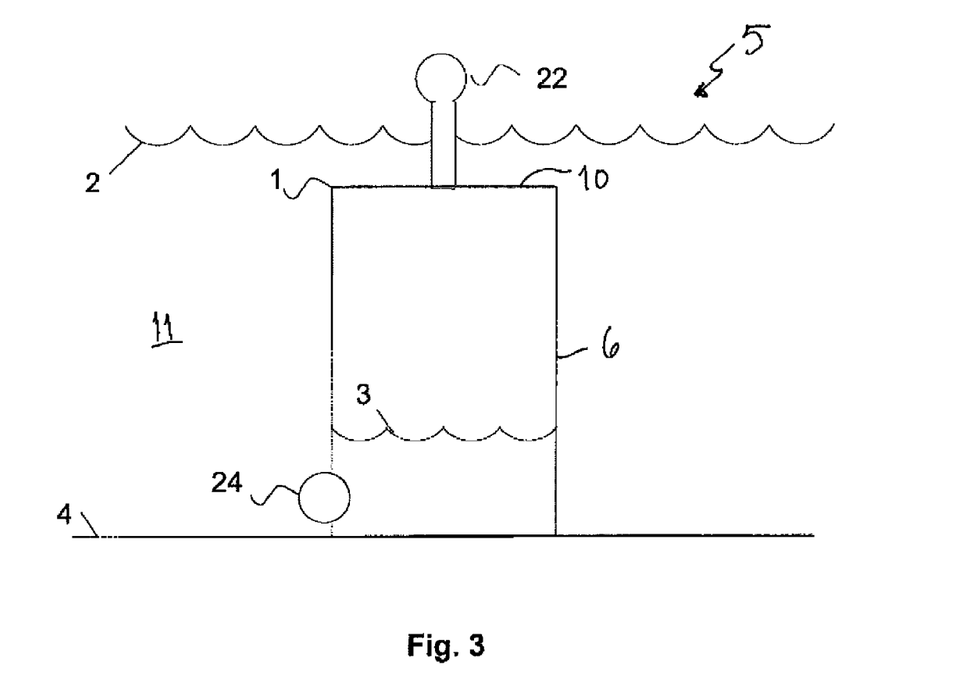
FIG. 3 illustrates a third embodiment of a hydroenergy generating plant.

In the embodiment of FIG. 3 the hydroenergy generating plant 5 comprises a compressed air energy storage. The top of the container 1 is covered with a water and air tight roof 10. In this type of embodiment the emptying of the structure could be done by pumping air to the structure 1 with a unit 22 with an air pump and allowing the water to leave the structure near the bottom 9 of the container via removal means 24. If removal means 24 also comprises inlet means and a generator unit, electricity can be created by leading water in through unit 24. If the unit 22 comprises a generator unit electricity would be produced by having air flow out via a turbine in unit 22. The plant 5 could be built as a simple "diving bell" with open bottom or just one or more openings in the bottom part of the walls 6.

Figure 4:
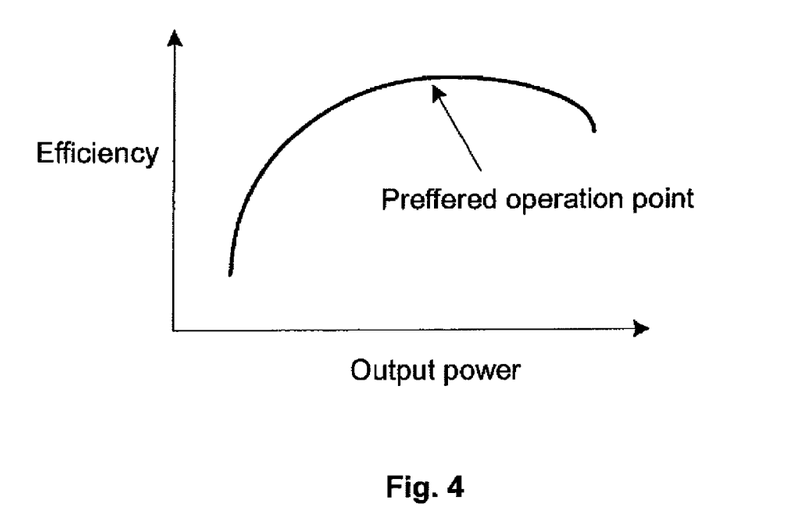
FIG. 4 is a diagram of efficiency vs. output power of a power plant.

Typically power plants such as a steam engine, diesel engine, hydro power plant, nuclear power plant etc, have certain preferred output power, see FIG. 4. Preferred output power might be one with most energy efficiency or for example one with combination of energy efficiency and loading of generator. Some generators produce most Mega watts per unit of fuel at full output power but others have optimum point at less than maximum output power. In addition many diesel generators are recommended to run for example at 75% of maximum output power possible from the generator in order to increase the life time of the generator. Full 100% run is typically recommended only for limited time like few hours per month or day. One embodiment of the disclosure is to enable a power plant to run in "preferred operation point". In situations where there is no need to large output power energy would be stored in a plant incorporating aspects of the disclosed embodiments. In situations where more output power is needed it would be released from the plant according to the disclosure. In addition to enabling power plants to run in preferred operation point, the aspects of the disclosed embodiments would also enable power plants from time to time to output more power than the nominal maximum capacity of the plant is i.e. >100% of normal maximum output power.

Figure 5:
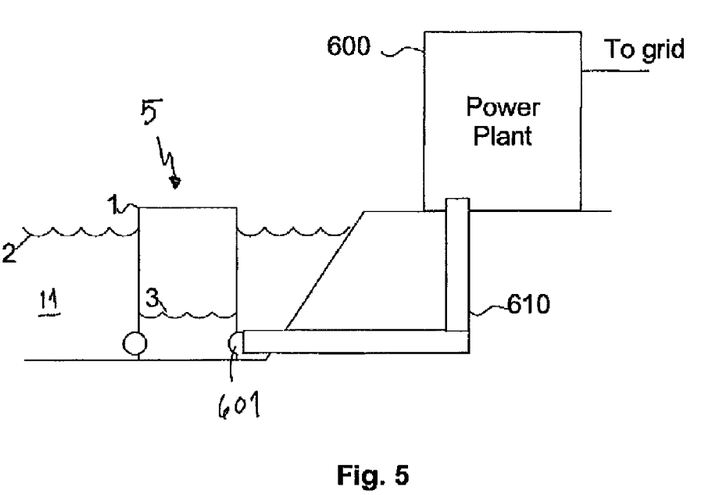
FIG. 5 illustrates a fourth embodiment of a hydroenergy generating plant connected to a cooling system of another power plant.

In one embodiment, a primary or secondary cooling system pumps of a nearby power plant could be used to empty the reservoir. One such embodiment is illustrated in FIG. 5. Secondary cooling water to a power plant 600, e.g. a nuclear power plant, is pumped with pumps 601 via pipes 610 from the container 1 of the hydroenergy generating plant 5. This results in greater overall efficiency of the system since there is no need to use excess electricity for running the pumps emptying the container 1. This sort of a system may be retrofitted to an existing power station.

In one embodiment, for making a decision on when to store energy by pumping water out from the container of the power plant and when to use generators to create energy is made by making use of market price of the electricity. There are losses on pumping and energy generation. If the difference in electricity price between for example night time and day time is larger than energy losses on efficiency the pumping should take place during the night time. Sometimes the electricity price can change rapidly, that is the case e.g. in hourly based SPOT market. In one embodiment, the water would be pumped out, kept out or used to generate energy according to algorithm:

```
IF
    PRICE_AT_TIME_OF_PUMPING_WATER_OUT
        <  PRICE_AT_TIME_OF_GENERATING_ELECTRICITY  ×
EFFICIENCY
    THEN PUMP
    IF
    PRICE_AT_TIME_OF_PUMPING_WATER_OUT
        < PRICE_NOW
        <  PRICE_AT_TIME_OF_GENERATING_ELECTRICITY  ×
EFFICIENCY
    THEN HOLD
    IF
    PRICE_NOW / EFFICENCY
    > PRICE_TIME_OF_PUMPING_WATER_OUT
    THEN generate energy.
``` i.e., in this embodiment, if price is between the price at the time of pumping water out and the expected high price then energy should not be stored or generated i.e. one should not store more energy or generate energy.

As an example of real prices (Euro/MWh), the Table 1 below shows maximum and minimum hourly rates between 6 May-13 May 2009 of Swiss power market. There are significant price fluctuations in the market enabling energy storage business even with moderate efficiency on pumping and recovering electricity from the stored energy.

TABLE 1

| Liefertag Delivery Date | Max | min | Diff |
|---|---|---|---|
| 13 May 2009 | 50.78 | 10.64 | 40.14 |
| 12 May 2009 | 48.06 | 10.94 | 37.12 |
| 11 May 2009 | 48.04 | 0.10 | 47.94 |
| 10 May 2009 | 32.81 | 3.22 | 29.59 |
| 09 May 2009 | 38.10 | 13.91 | 24.19 |
| 08 May 2009 | 43.08 | 15.33 | 27.75 |
| 07 May 2009 | 52.07 | 14.61 | 37.46 |
| 06 May 2009 | 44.58 | 6.70 | 37.88 |

According to one embodiment of the present disclosure, there is a computer system connected preferably via Internet to follow either real time or close real time, on a periodic manner or random manner the price and supply and demand of the electricity to make decision according to an algorithm or similar decision means.

In the case of building an energy generating plant incorporating aspects of the disclosed embodiments in connection with another power plant the decisions can be made using input from the processes and control data of the another power plant. According to some embodiments the control data can be derived from overall loading information of the electricity grid and for example by calculating cumulative electricity supply/usage at given time. Additionally in large grids covering multiple time zones, like the one in Russia, statistical information related to consumption and production of energy in different time zones can be used to predict when and where to store and/or generate energy.

Similarly in the case of emptying the container according to the aspects of the disclosed embodiments by using, for example, wind, solar, wave energy etc, the decisions on if to hold, generate or pump could be made based on weather forecast. In one embodiment the inventive energy generating plant is controlled by a logic that gets preferably via Internet or other means weather information from sources such as meteorological institute to determine if the pumps should be used or not. In one embodiment an algorithm could for example use most of the wind energy for pumping water out (i.e. storing energy) it the forecast is that there will be lower wind speed or no wind in future compared to current wind. This way one would be able to "store" wind to ensure supply of "green" energy for those appreciating it.

Figure 6:
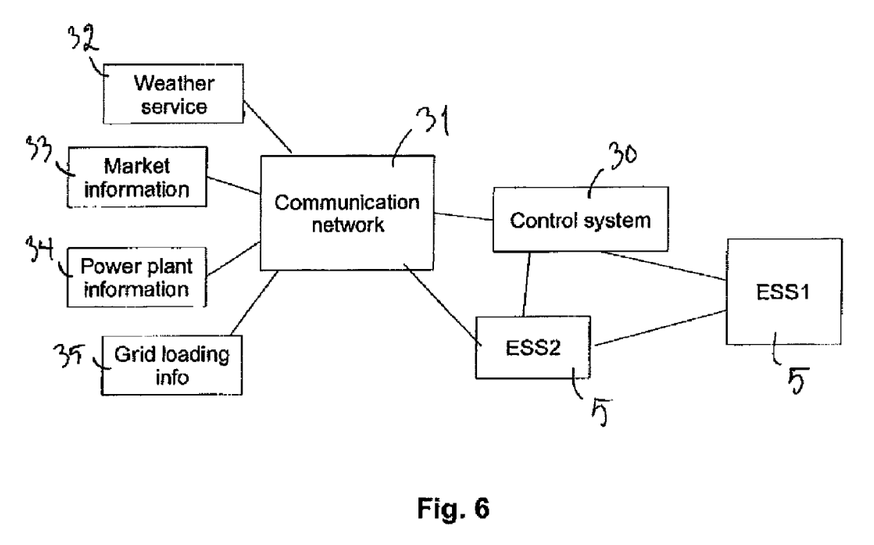
FIG. 6 is a diagram of one possible control system architecture for a hydroenergy generating plant incorporating aspects of the disclosed embodiments.

In some embodiments, one or more server systems are connected to one or more energy generating plants. FIG. 6 presents one embodiment where two energy generating plants or energy storing systems 5 (ESS) are controlled by a control system 30. Number of energy storing systems 5 connected to one control system 30 can be one or more, e.g. 1-5, 1-10 or 1-50. Control system 30 and plants 5 are connected via a communication network 31. The system gets input data from various sources, e.g. weather information from weather service 32, market information 33 such as electricity price from market information providers, electricity producing price information, power plant information 34 from one or more power plants, grid loading information 35 from grid companies. Decisions on whether to store or produce energy with the plants 5 is made using the input data e.g. in an algorithm as described above. Data connections in the system with the communication network 31 are presented by lines in FIG. 6. Connections may be arranged with any suitable connectivity means such as Internet or wireless networks.

Figure 7:
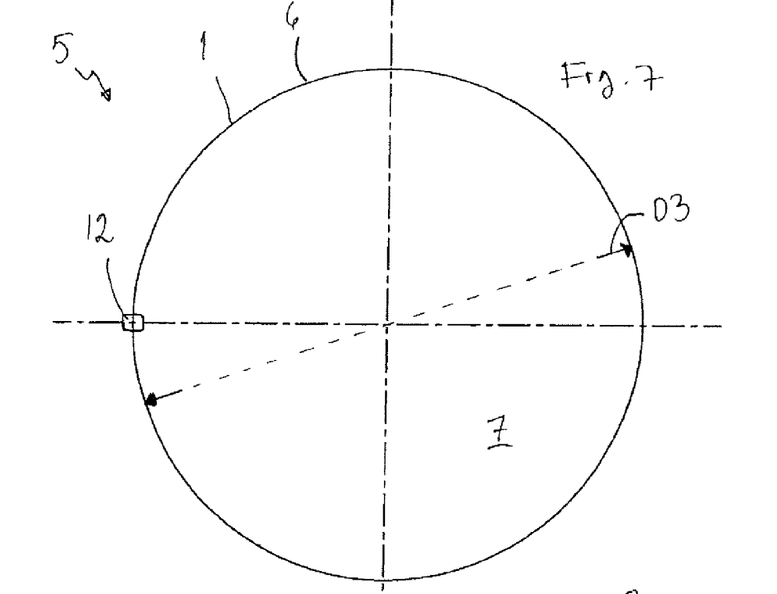
FIG. 7 illustrates a fifth embodiment of a hydroenergy generating plant.
Figure 8:
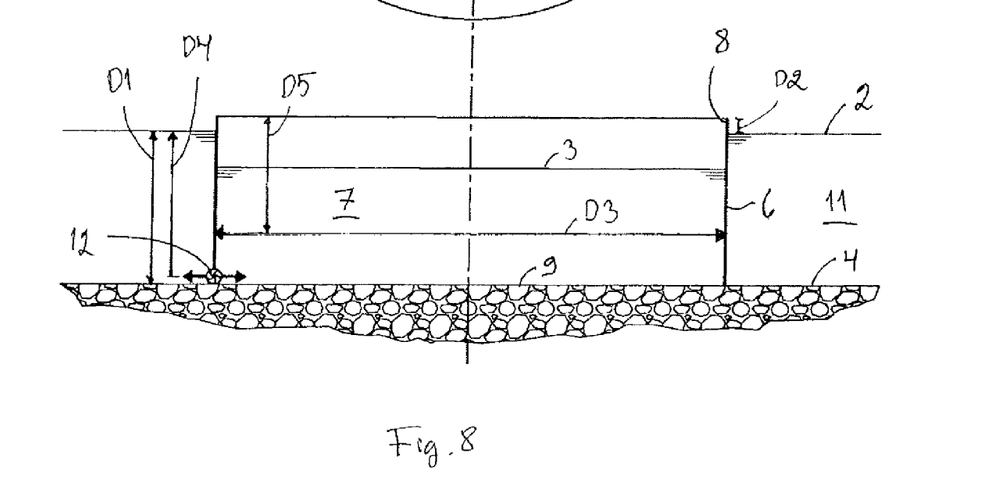
FIG. 8 illustrates a side view of the embodiment of FIG. 7.

FIGS. 7 and 8 present a further embodiment of a hydroenergy generating plant 5 much like the embodiment of FIG. 1. Plan 5 comprises a structure i.e. a container 1 arranged at the bottom 4 of a body of water 11. The bottom 4 of the body of water is used as the bottom 9 of the container. Bottom 9 could also be man-made, e.g. of steel. Container has mainly vertical steel walls 6 defining in them a cylindrical and an at least mainly water-tight reservoir 7 for water. Top 8 of the walls is above the water level 2 outside the container 1 so that large amounts of water cannot enter the reservoir unintentionally. A pump/generator unit 12 is arranged on the wall 6 of the container 1 near the bottom 4 of the body of water. The pump/generator unit 12 can be arranged to either pump water out of the container into the body of water 11 or to allow water flow into the reservoir whereby electricity is produced. D1 is the distance from sea bottom to sea level, D2 is the distance from sea level to top of the walls, D3 is the diameter of the circular container and D4 is distance from the turbine axle of the pump/generator unit 12 to sea level. D4 defines the maximum output of the generator. The distance D4 may by e.g. more than 90%, more than 95% or more than 97% one or both of distance D1 and height of the walls 6, i.e. D1+D2. The distance D5 is the height of water level 3 in the reservoir 7 from the bottom 9 of the reservoir 1.

In general, the amount of energy available in an energy storage system incorporating aspects of the disclosed embodiments can be calculated using equation for potential energy:

$$E = m \times g \times h$$

where m is mass of the water pumped out of the reservoir, g is gravity constant (9.81 m/sec2) and h is height. Using notations of FIG. 8 an energy storage system incorporating aspects of the disclosed embodiments can approximately hold an energy capacity of:

$$E=3.14\times(D3/2)^2\times D4\times 1000 \text{ kg/m}^3\times 9.81 \text{ m/sec}^2\times D4/2.$$

Table 2 shows examples on the capability of the energy storing system incorporating aspects of the disclosed embodiments. In the examples of Table 2 reversible turbine modules are used both to pump the reservoir empty and to generate electricity. For example an energy storage system with diameter D3 of 100 meters and height D4 of 30 meters one can calculate as stored potential energy $E=33.5\times 10^9$ Joule. Using efficiency of 0.9 for pumping and energy generation this creates a possible energy capacity of 8.4 MWh per day. Larger size gives higher output, for example if D3 is 200 meters and D4 is 50 meters, the plant would have a capacity of almost 100 MWh per day.

Figure 9:
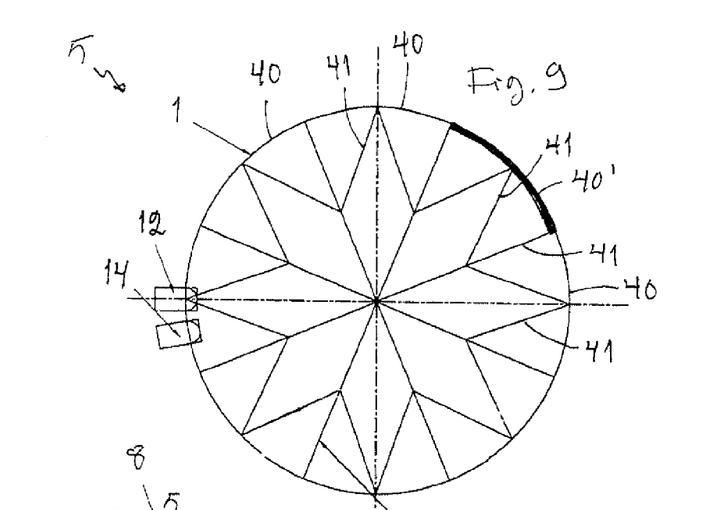
FIG. 9 illustrates a sixth embodiment of a hydroenergy generating plant.

4 of the body of water 11. Structure 1 is constructed from eight segments 40, 40' attached to each other to form a substantial circle as shown in FIG. 9. Each wall segment 40, 40' forms a part of the whole circle form structure 1. A substantially water-tight reservoir 7 for water is formed inside wall segments 40, 40'. The number and size of segments 40, 40' may vary depending on the situation. All segments 40, 40' may be approximately of same size, as in FIG. 9. The wall segments 40, 40' are supported by bracing beams 41 to the bottom 9 of the reservoir 7. Support structures can be arranged towards the outside of the structure 1. The supporting bracing 41 may form triangle formations, as seen in FIG. 9. One of the segments 40' is drawn with a thicker line for illustrative purpose. There are two pump/generator units 12 and 14 arranged near the bottom of the body of water 11, as can be seen from FIG. 9. Only one of them is shown in the vertical cross-section view of FIG. 10.

Figure 10:
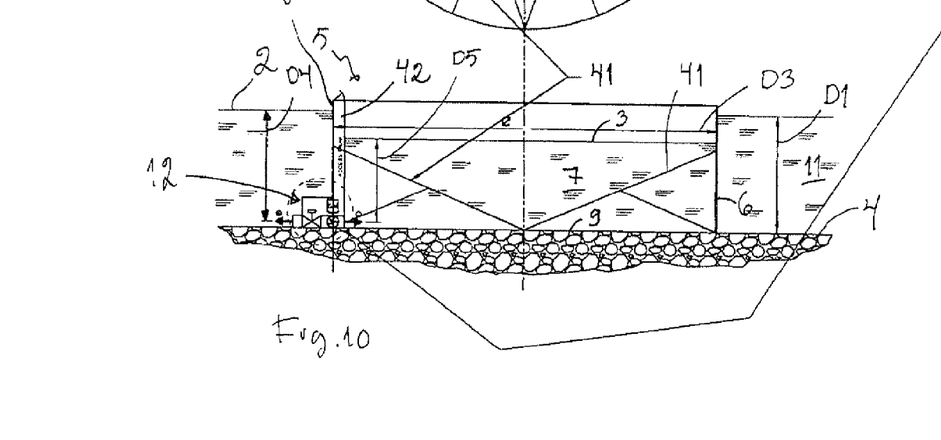
FIG. 10 illustrates a side view of the embodiment of FIG. 9.

In one embodiment, the structure 1 comprises a service shaft 42 as shown in FIG. 10. Service shaft 42 reaches from

TABLE 2

12 h filling/12 h emptying

| | | PLANT SIZE | | | | | |
|---|---|---|---|---|---|---|---|
| | | 100/30 | 100/40 | 100/50 | 200/30 | 200/40 | 200/50 |
| TANK | | | | | | | |
| Diameter | [m] | 100.0 | 103.0 | 100.0 | 280.0 | 208.0 | 200.0 |
| Area | [m2] | 7,854 | 7,854 | 7,854 | 31,436 | 31,418 | 31,418 |
| Depth | [m] | 30.0 | 40.0 | 56.0 | 30.0 | 40.0 | 50.0 |
| Turbine depth | [m] | 29.5 | 39.5 | 49.5 | 29.5 | 39.5 | 49.5 |
| Volume, total | [m3] | 235,619 | 214,169 | 392,699 | 942,478 | 1,256,637 | 1,579,798 |
| Volume, effective | [m3] | 231,892 | 310,232 | 368,772 | 926,770 | 1,240,929 | 1,565,088 |
| Water density | [kg/m3] | 1,000 | 1,000 | 1,000 | 1,000 | 1,000 | 1,000 |
| TURBINE | | | | | | | |
| Average flow | [m3/s] | 5.4 | 7.2 | 9.0 | 21.5 | 29.7 | 38.0 |
| ENERGY | | | | | | | |
| mass of water | [l] | 231,692 | 310,232 | 380,772 | 826,770 | 1,240,929 | 1,555,068 |
| h | [m] | 14.75 | 18.75 | 24.75 | 14.75 | 19.75 | 24.75 |
| g | [m/s2] | 9.81 | 9.81 | 9.81 | 9.81 | 9.81 | 9.81 |
| E potential | [MJ] | 33,625 | 60,107 | 94,393 | 134,101 | 240,427 | 377,672 |
| filling time | [s] | 12.00 | 12.00 | 12.00 | 12.00 | 12.00 | 12.00 |
| filling time | [s] | 43,200 | 43,200 | 43,200 | 43,200 | 43,200 | 43,200 |
| efficiency | [ ] | 0.90 | 0.90 | 0.90 | 0.90 | 0.90 | 0.90 |
| P | [MW] | 6.70 | 1.25 | 1.97 | 2.78 | 5.01 | 7.87 |
| E available | [MWh] | 8.4 | 15.0 | 23.8 | 33.5 | 63.1 | 94.4 |
| PLANT DATA | | | | | | | |
| sts turbine | [ ] | 0.90 | 0.90 | 0.90 | 0.90 | 0.90 | 0.90 |
| g | [m/s2] | 9.81 | 9.81 | 9.81 | 9.81 | 9.81 | 9.81 |
| h | [m] | 14.8 | 19.8 | 24.8 | 14.8 | 19.8 | 24.8 |
| v | [m3/s] | 6.4 | 7.2 | 9.0 | 21.5 | 28.7 | 36.0 |
| P | [MW] | 0.70 | 1.25 | 1.97 | 2.79 | 6.01 | 7.87 |
| EMPTYING | | | | | | | |
| emptying time | [h] | 12.00 | 12.00 | 12.00 | 12.00 | 12.00 | 12.00 |
| average head | [m] | 14.75 | 19.75 | 24.75 | 14.75 | 19.75 | 24.75 |
| pump capacity | [m3/h] | 19,306 | 25,853 | 32,398 | 77,231 | 193,411 | 129,591 |
| pump effy | [ ] | 0.9 | 0.9 | 0.9 | 0.9 | 0.9 | 0.9 |
| P | [MW] | 0.86 | 1.86 | 2.43 | 3.48 | 6.18 | 8.71 |
| E required | [MWh] | 16.3 | 16.5 | 29.1 | 41.4 | 74.2 | 116.5 |
| SUMMARY | | | | | | | |
| Capacity/day | [MWh] | 8.4 | 15.0 | 23.5 | 33.5 | 89.1 | 94.4 |
| Loss/day | [MWh] | 2.0 | 3.8 | 6.5 | 7.9 | 14.1 | 22.1 |
| Plant efficiency | [ ] | 0.81 | 0.81 | 0.81 | 0.81 | 0.81 | 0.81 |

FIGS. 9 and 10 present further embodiments of a hydroenergy generating plant 5 incorporating aspects of the disclosed embodiments. The steel structure 1 is attached in the bottom the upper end 8 of the wall 6 along the wall 6 down to the pump/generator unit 12 near the bottom 4 of the body of water 11. Service shaft 42 can comprise stairs or an elevator or similar means. In alternate embodiments, structure 1 may also comprise other service units, such as a pier for service boats or ships, control center of the power station and living quarters for personnel. These may be arranged on or near the upper end 8 of the walls.

Figure 11:
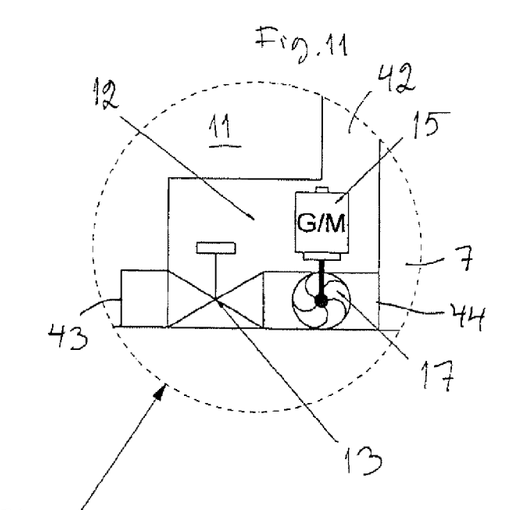
FIG. 11 is an enlargement of a detail in FIG. 10.

One embodiment of a pump/generator unit 12 incorporating aspects of the disclosed embodiments is described in FIG. 11. A service shaft 42 reaches down to the unit 12, situated on the bottom 9 of the body of water 11. Water can be led through the wall 6 between the body of water 11 and the reservoir 7 via an outer opening 43, valve 13, turbine/pump wheel 17 and an inner opening 44. The axle of the turbine/pump wheel 17 is connected to a generator/motor 15 unit. The system is a so called reversible turbine/generator assembly, which can pump water out from the reservoir 7 or produce electricity depending on what is wanted. When water is pumped out from the reservoir 7, the generator/motor 15 unit is used as an electric motor which rotates the turbine/pump wheel 17 in such a way that water is pumped out from outer opening 43. When electricity is produced, water is led in through outer opening 43, via the turbine/pump wheel 17 so that water rotates it, which turbine/pump wheel 17 is now arranged to rotate the generator/motor 15, producing electricity. Closing of the control valve 13 is needed especially when the system is on hold, i.e. when water is not pumped out from the container 1 nor led into it.

Figure 12:
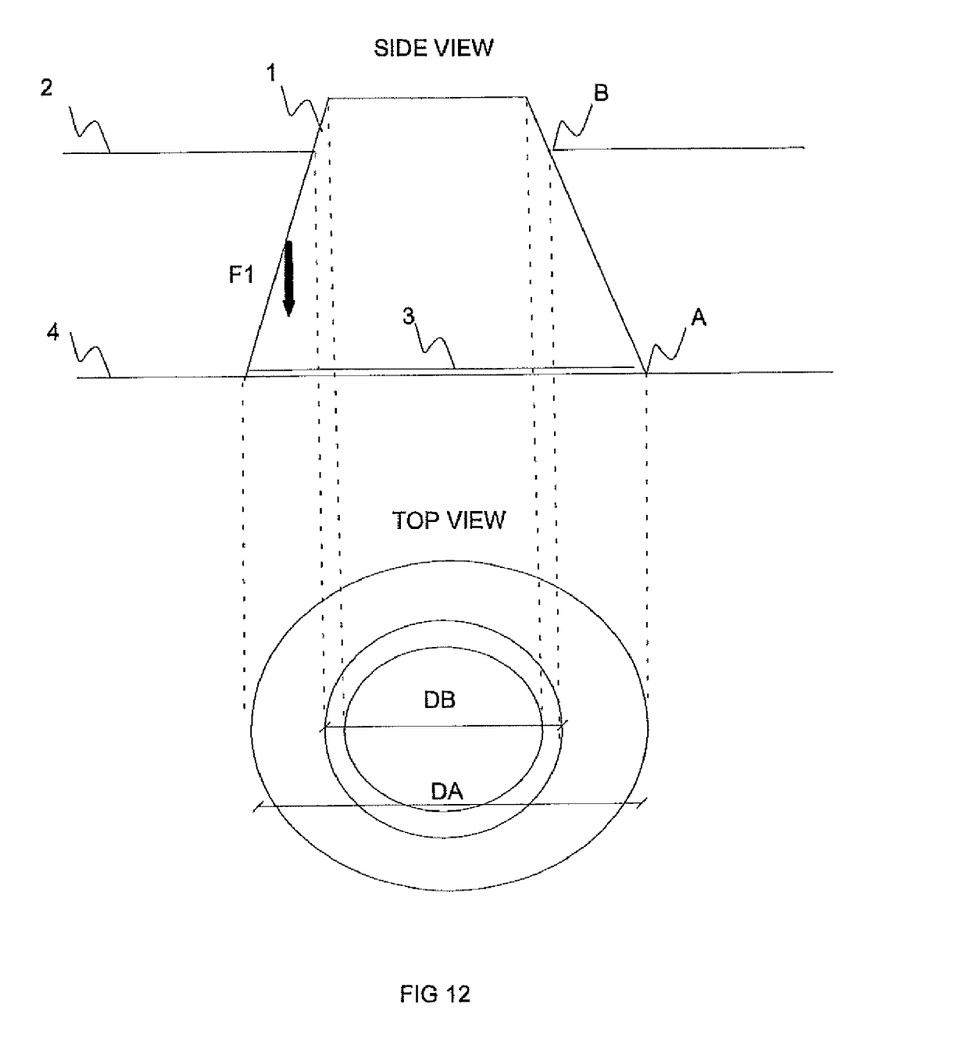
FIG. 12 illustrates an embodiment of a hydroenergy generating plant.

FIG. 12 shows one exemplary embodiment to overcome the problems of buoyancy of structures in water. According to this embodiment the bottom of the structure 1 (or reservoir 7) is on sea bed/sea bottom 14. There is no water or limited amount of water in limited areas under the structure causing pressure to lift the structure 1 up. In practice, bottom 9 of structure 1 is on the level of sea bed 4 or in some cases below it. In an advantageous embodiment, the water container walls 6 are angled in a way that diameter of the container is smaller in upper part than in lower part. In the top view of FIG. 12 diameter at the sea level 2 is designated as DA and diameter of the structure at the bottom part i.e. on the sea bed is designated with DB. Area on which downward force F1 applies is $$A=3.14 \times (DB/2)^2 - 3.14 \times (DA/2)^2$$

Downward force depends on depth of the water i.e. pressure difference between inner surface of reservoir wall (in practice air i.e. 1 bar) vs. pressure of water on outer surface of the wall i.e. 1 bar/meter+1 bar from atmosphere. In depth of 10 meters total pressure is 11 bar resulting as difference 10 bars. 10 bar pressure equals of force similar as having weight of $10 \times 1000$ kg per square meter. As a rough approximation of force, assuming a structure with reservoir 7 with depth 30 meter and DB 50 meter and DA 60 meters, area is 3.14 $(30^2-25^2)=864$ m$^2$. Using as an average (adjusted to area) depth of 20 meters results to force equivalent of having weight of $864 \times 20 \times 1000$ kg=17 280 000 kg holding structure in the bottom.

Figure 13:
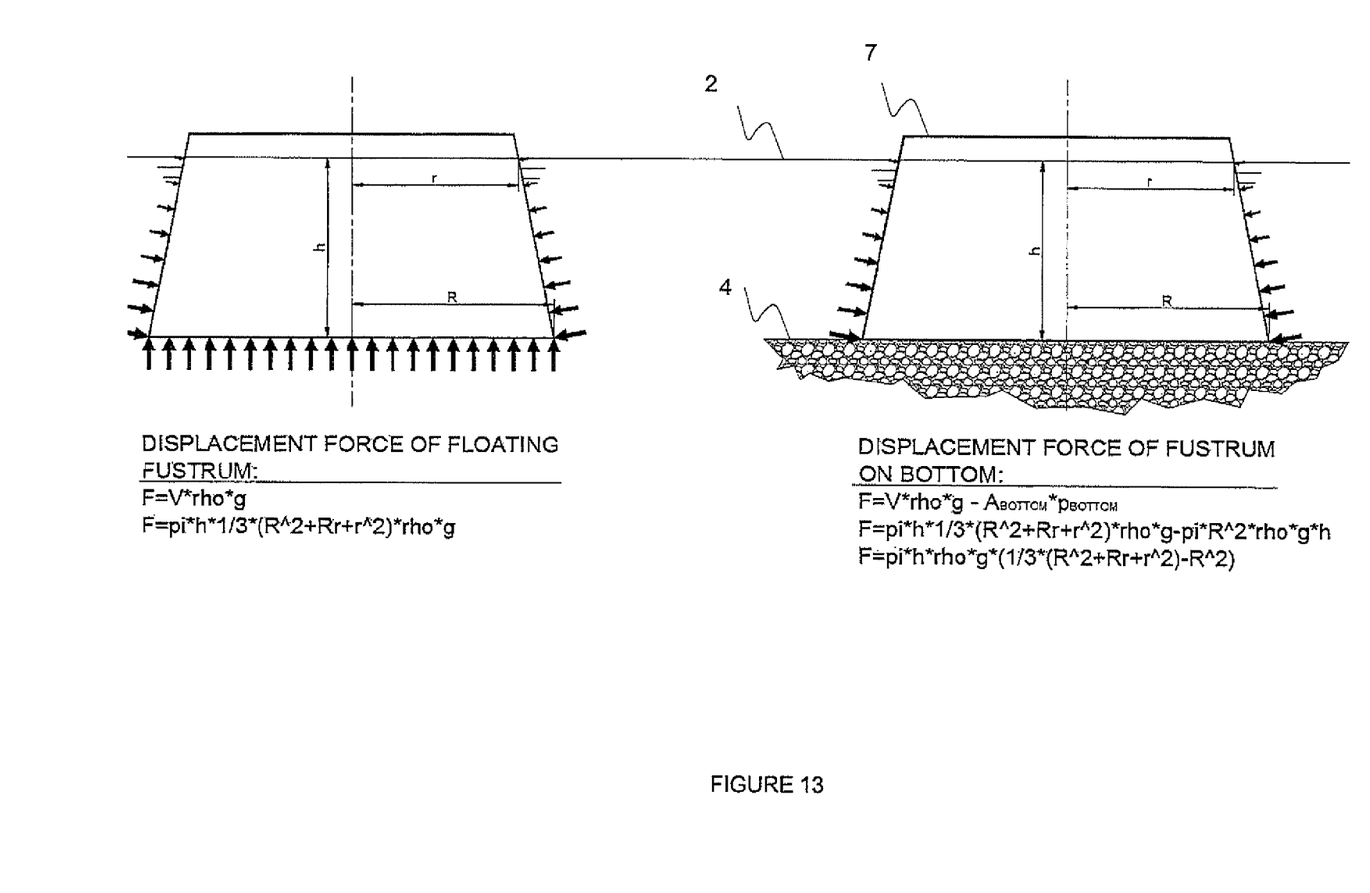
FIG. 13 illustrates example forces impacting an embodiment of the present disclosure.

Total force can be calculated more accurately, for example, by integrating from sea surface 2 to sea bed 4. An additional method of estimating the force keeping the structure/reservoir down is to calculate displacement force (Fd) for an empty storage unit=displacement force of the volume of fustrum of cone (Fv)−force on bottom (Fb). Related force vectors are shown in FIG. 13.

$$Fv=pi*h*\tfrac{1}{3}*(R^2+Rr+r^2)*rho*g;$$

$$Fb=pi*R^2*h*rho*g;$$

$$Fd=Fv-Fb=pi*h*rho*g*(\tfrac{1}{3}*(R^2+Rr+r^2)-R^2)$$

Where:
pi=3.14159
h=height of fustrum (fustrum=cut cone)
rho=density of water, e.g. 1,000 kg/m3 in fresh water
g=9.81 m/s2
R=larger diameter of fustrum
r=smaller diameter of fustrum
Example:
Cone smaller diameter: 300 m→R=150 m, Cone bigger diameter: 290 m→r=145 m, Cone height: 50 m
Fd=pi*50 m*1000 kg/m3*9.81 m/s2*($\tfrac{1}{3}$*(R$^2$+Rr+r$^2$)−R$^2$)=−1 142,872,137 N=−1,142,872 kN or −116,501 t (negative value, i.e. cone is pushed down, in addition comes the weight of the structure).

Force can also be calculated as t/m on perimer: Fd/2*pi*R=123 t/m

Sea water pressure results to large downwards force keeping the structure firmly in the sea bed 4 when empty from water 3. This type of structure which brings added downward force towards sea bed is beneficial since the total structure is more robust against storms and waves. In practice, the structure of this embodiment could be cylinder like with smaller diameter in the top part of the structure than in the lower part of the structure. Walls 6 of reservoir 7 are aligned in a way that some of the force resulting from pressure difference between inside and outside of reservoir is directed downwards.

Only some aspects of the disclosed embodiments are shown in the figures. The figures do not separately disclose all facts of secondary importance regarding the main idea of the invention, known as such or obvious as such for a person skilled in the art. It is apparent to a person skilled in the art that the invention is not limited exclusively to the examples described above, but that the invention can vary within the scope of the claims presented below. The dependent claims present some possible embodiments of the invention, and they are not to be considered to restrict the scope of protection of the invention as such.

What is claimed is:

1. A method of generating hydroenergy comprising:
providing a structure in a body of water, the structure comprising:
a reservoir, the reservoir having a set of walls defining an inner volume for water, the structure configured so that a portion of the structure is situated at least partly below a surface of the body of water and a bottom of the structure is situated at or below a level of a sea bed to limit an amount of water underneath the structure, and wherein each of the walls is angled relative to the sea bed to direct a force resulting from a pressure difference between an inside and an outside of the reservoir downwards towards the sea bed;
storing potential energy by removing water from the reservoir;
leading water from the body of water into the reservoir; and
recovering energy from the water while leading the water into the reservoir.

2. The method according to claim 1 wherein the structure is in a form of a cylinder and wherein a top portion of the cylinder has a smaller diameter than a bottom portion of the cylinder.

3. The method according to claim 1, wherein the angle of each of the walls of the reservoir relative to the sea bed defines an opening at a bottom of the structure that is larger in diameter than an opening at a top of the to direct the force resulting from the pressure difference between the inside and outside of the reservoir downwards onto the walls.

4. The method according to claim 1, wherein water is removed from the reservoir by pumping the water out from the reservoir with one or more pumps arranged in the structure.

5. The method according to claim 1, wherein water is lead into the reservoir and removed from the reservoir via a reversible turbine/generator assembly.

6. The method according to claim 1, wherein water removed from the reservoir is pumped into a cooling system of a power plant.

7. The method according to claim 1, wherein energy is recovered by leading water from the body of water into the reservoir via one or more turbines arranged in the structure.

8. The method according to claim 4, wherein electricity is generated using one or more generators attached to the one or more turbines.

9. A hydroenergy generating plant, comprising:
a structure arranged in a body of water, the structure comprising:
a top portion, a bottom portion and walls between the top and bottom portions defining a reservoir therein, the reservoir having an inner volume for water,
the structure configured so that a portion of the structure is situated at least partly below a surface of the body of water and the bottom portion of the structure is at or below a level of a sea bed to limit an amount of water underneath the structure, and wherein each of the walls is angled relative to the sea bed to direct a force resulting from a pressure difference between an inside and an outside of the reservoir downwards towards the sea bed;
removal means for removing water from the reservoir;
inlet means for leading water from the body of water into the reservoir;
energy recovering means configured to recover energy from potential energy of the water led into the reservoir through the inlet means.

10. The plant according to claim 9, wherein the inlet means comprises one or more turbines configured to lead water from the body of water into the reservoir.

11. The plant according to claim 9, wherein that the energy recovering means comprises one or more generators attached to the one or more turbines for generating electricity.

12. The plant according to claim 9, wherein the reservoir is substantially air-tight and comprises:
air exhaust means configured to remove air from the reservoir when pressure in the reservoir exceeds a certain limit value;
air inlet means configured to lead air into the reservoir during removal of water from the reservoir;
wherein air exhaust means are configured to remove air from the reservoir via the energy recovering means.

13. The hydroenergy generating plant of claim 9, wherein the removal means and the energy recovering means comprises a reversible turbine/generator assembly, the reversible turbine/generator assembly being disposed in the bottom portion of the structure.

14. The plant according to claim 9, wherein the removal means comprises one or more pumps configured to pump water out from the reservoir.

15. The plant according to claim 14, wherein the removal means are connected to a cooling system of a power plant, and said one or more pumps are configured to pump the water out from the reservoir into the cooling system of the power plant.

16. The plant according to claim 9, wherein the structure is in a form of a cylinder, wherein the top portion of the structure has a smaller diameter than the bottom portion of the structure.

17. The plant according to claim 16, wherein the angle of each of the walls of the reservoir relative to the sea bed defines an opening at a bottom of the structure that is larger in diameter than an opening at a top of the structure.

18. The plant according to claim 9, wherein the walls of the structure extend from substantially the sea bed of the body of water to substantially above the surface of the body of water.

19. The plant according to claim 18, wherein the body of water is an ocean, a sea or a lake.

20. A method of storing potential energy of water, the method comprising:
providing a reservoir for water, a portion of the reservoir being positioned at least partly below a surface of a body of water,
the reservoir having a top portion and a bottom portion, and walls defining the reservoir, and wherein each of the walls is angled relative to the sea bed to direct a force resulting from a pressure difference between an inside and an outside of the reservoir downwards towards the sea bed, and wherein the angle of the walls relative to the seabed defines an opening in the top portion that has a diameter that is less than a diameter of an opening in the bottom portion;
positioning a bottom portion of the reservoir on a bed of the body of water;
leading water from the body of water into the reservoir; and
storing potential energy by removing water from the reservoir.

* * * * *